United States Patent
Liu et al.

(10) Patent No.: US 7,769,140 B2
(45) Date of Patent: Aug. 3, 2010

(54) ANALOG SUBSCRIBER BOARD

(75) Inventors: Lei Liu, Shanghai (CN); Jun Chen, Shanghai (CN); Ying Chen, Shanghai (CN); WeiJun Gu, Shanghai (CN)

(73) Assignee: Alcatel-Lucent, Paris (FR)

( * ) Notice: Subject to any disclaimer, the term of this patent is extended or adjusted under 35 U.S.C. 154(b) by 1568 days.

(21) Appl. No.: 11/002,253

(22) Filed: Dec. 3, 2004

(65) Prior Publication Data
US 2005/0152532 A1 Jul. 14, 2005

(30) Foreign Application Priority Data
Dec. 30, 2003 (CN) ............ 2003 1 0122996

(51) Int. Cl.
H04M 1/24 (2006.01)
H04M 3/08 (2006.01)
H04M 3/22 (2006.01)

(52) U.S. Cl. ............... 379/27.06; 379/2; 379/26.01; 379/399.01; 379/413.02

(58) Field of Classification Search ............... 379/1.01, 379/22.06, 26.01, 27.01, 27.06, 29.01, 399.01, 379/413.02, 413.03
See application file for complete search history.

(56) References Cited

U.S. PATENT DOCUMENTS

| | | | |
|---|---|---|---|
| 4,445,007 A | 4/1984 | Forestier et al. | |
| 4,594,704 A * | 6/1986 | Ollivier | 370/217 |
| 5,323,460 A * | 6/1994 | Warner et al. | 379/399.01 |
| 5,367,567 A | 11/1994 | Sugawara et al. | |
| 5,579,386 A * | 11/1996 | Koda | 379/252 |
| 5,598,455 A * | 1/1997 | Bliven et al. | 379/22.04 |
| 6,490,277 B1 * | 12/2002 | Tzotzkov | 370/360 |
| 2006/0256931 A1 * | 11/2006 | Bendig | 379/26.01 |

FOREIGN PATENT DOCUMENTS

DE 196 27 937 A1 1/1998
EP 0 386 369 A2 9/1990

* cited by examiner

Primary Examiner—Binh K Tieu
(74) Attorney, Agent, or Firm—Harness, Dickey & Pierce

(57) ABSTRACT

The present invention is a new solution of line and relay in an analog subscriber board, which has a less number of relays and can decrease the cost and save the space while realizing the basic functions in a voice network. The technical solution of the invention provides each subscriber with two relays to connect the subscriber line interface circuit, the subscriber line, the ring bus and the test bus, realizing the basic functions relevant to the talking, such as talking, ringing, etc. In order to add the auxiliary functions such as the testing function and the monitoring function, the subscriber lines are grouped, and at least one relay is supplemented in a subscriber group, the subscriber group relays together with above two subscriber relays will be used to connect the subscriber line interface circuit, the subscriber line, the ring bus and the test bus to perform the basic functions relevant to talking and the auxiliary functions such as testing, monitoring, etc.

8 Claims, 5 Drawing Sheets

ANALOG SUBSCRIBER BOARD

TECHNICAL FIELD

The present invention relates to a solution of line and relay in an analog subscriber board used in a voice network, more specifically, to a solution of line and relay in an analog subscriber board in which the number of the relay is reduced.

TECHNICAL BACKGROUND

In a voice network, each subscriber group has a common ring bus and a test bus. Moreover, each subscriber in the subscriber group has an independent subscriber line interface circuit (SLIC).

On an analog subscriber board, the basic functions of talking and ringing must be provided for each subscriber in a group. In addition, the different functions of testing and monitoring should be provided selectively for subscriber according to the requirements of different voice networks.

In order to perform these functions, three relays are provided for each subscriber on an analog subscriber board of the prior art, which are connected to the ring bus, the test bus, the subscriber line interface circuit and the subscriber line respectively, as shown in FIG. 1.

FIG. 1 is a schematic diagram showing the connection of relays on an analog subscriber board of the prior art, wherein only three relays K1, K2, K3 relevant directly to controlling and realizing the various functions of a voice network, as well as ring bus 2, test bus 3, subscriber line interface circuit (SLIC) 1 and subscriber line 4 are shown, while other parts being not in the drawing. In this drawing, subscriber line interface circuit (SLIC) 1 is connected to movable contact point K11 of relay K1, ring bus 2 is connected to another movable contact point K12 of relay K1, test bus 3 is connected to static contact point K33 of relay K3, subscriber line 4 is connected to movable contact point K21 of relay K2 and movable contact point K32 of relay K3 simultaneously. Static contact point 13 of relay K1 is connected to static contact point K23 of relay K2, another movable contact point K22 of relay K2 is connected to another movable contact point K31 of relay K3.

In FIG. 1, for simplification, ring bus 2, test bus 3, subscriber line interface circuit 1 and subscriber line 4 are all indicated by single-lines. In an actual voice network all lines are constituted of double-lines. Especially, subscriber line interface circuit 1 and subscriber line 4 should be constituted of the pair of TIP/RING double-line. Correspondingly, the contact points of various relays should be twice as many as shown in FIG. 1.

In FIG. 1, for simplification, only one subscriber is shown in the connection schematic diagram. In an actual application, subscriber line interface circuit 1 and subscriber line 4 are for each subscriber solely, but ring bus 2 and test bus 3 are common to all subscribers in a group. A plurality of analog voice functions can be provided by providing three relays K1, K2, K3 for each subscriber respectively.

When subscriber line 4 of a subscriber is connected to subscriber line interface circuit 1 of the subscriber, the analog subscriber board realizes the talking/idle function of the subscriber; when subscriber line 4 is connected to ring bus 2, the analog subscriber board realizes the ringing function of the subscriber; when subscriber line 4 is connected to test bus 3 and subscriber line interface circuit 1 of the subscriber simultaneously, the analog subscriber board realizes the talking monitoring function for the subscriber; when subscriber line 4 is connected to ring bus 2 and test bus 3 simultaneously, the analog subscriber board realizes the ringing monitoring function for the subscriber; when test bus 3 is connected to subscriber line interface circuit 1 of a subscriber, the analog subscriber board realizes the function for testing the subscriber line interface circuit of the subscriber; when test bus 3 is connected to ring bus 2, the analog subscriber board realizes the ring testing function; when test bus 3 is connected to subscriber line 4 of a subscriber, the analog subscriber board realizes the function for testing the subscriber line of the subscriber.

Table 1 shows the realization of the various functions of the analog subscriber board in FIG. 1. Various functions can be realized by controlling the states of three relays K1, K2, K3 (that is, the movable contact point is turned on) respectively.

TABLE 1

Realization of Various Functions of Analog Subscriber Board in FIG.1

| State of K1 | State of K2 | State of K3 | Function |
|---|---|---|---|
| K11 | K21 | K31 | talking/idle |
| K12 | K21 | K31 | ringing |
| K11 | K21 | K32 | monitoring talking |
| K12 | K21 | K32 | monitoring ringing |
| K11 | K22 | K31 | testing subscriber line interface circuit |
| K12 | K22 | K31 | testing ring |
| — | K22 | K32 | testing subscriber line |

More specifically, when relay K2 is controlled to turn on movable contact point K21 connected to subscriber line 4, the analog subscriber board realizes the basic functions (talking/idle or ringing) or the monitoring functions (talking monitoring or ringing monitoring), wherein when relay K3 turns on movable contact point K31 connected to relay K2, the analog subscriber board realizes correspondingly the talking/idle function or ringing function respectively according to that relay K1 turns on movable contact point K11 connected to subscriber line interface circuit 1 or turns on movable contact point K12 connected to ring bus 2; when relay K3 turns on movable contact point K32 connected to subscriber line 4, the analog subscriber board realizes correspondingly the talking monitoring function or ringing monitoring function respectively according to that relay K1 turns on movable contact point K11 connected to subscriber line interface circuit 1 or turns on movable contact point K12 connected to ring bus 2.

When relay K2 is controlled to turn on movable contact point K22 connected to relay K3, the analog subscriber board realizes testing functions (testing the subscriber line, subscriber line interface circuit or ring), wherein when relay K3 turns on movable contact point K32 connected to subscriber line 4, the analog subscriber board realizes the function for testing the subscriber line; when relay K3 turns on movable contact point K31 connected to relay K2, the analog subscriber board realizes correspondingly the functions for testing the subscriber line interface circuit or testing the ring respectively according to that relay K1 turns on movable contact point K11 connected to subscriber line interface circuit 1 or turns on movable contact point K12 connected to ring bus 2.

Hence, the analog subscriber board realizes the various basic functions and the testing and monitoring functions by controlling the states of three relays respectively.

Three relays must be provided for each subscriber on this kind of analog subscriber board. However, relays occupy relatively large space, which is unfavorable for the design of the subscriber board. More essentially, relay has a high cost, for example, the relay of Fujistu FBR12ND04-P-25 type costs 3.6 yuan R.M.B. each. It is evident that the analog subscriber board having a less number of relay becomes the object of research of various providers because the manufacturing cost of the subscriber board is limited by the number of relays used.

SUMMARY OF THE INVENTION

The object of the invention is to provide a new solution of line and relay in an analog subscriber board, which has a less number of relays with respect to each subscriber and can decrease the cost and save the space while realizing the basic functions in a voice network.

Meanwhile, the possibility of error can be reduced and the power consumption can be decreased when using the analog subscriber board of the invention.

An analog subscriber board of the invention comprises a subscriber line interface circuit and subscriber line as well as two relays for each subscriber, and a common ring bus and a common test bus in one subscriber group. The subscriber line interface circuit is connected to a movable contact point of a first relay, the ring bus is connected to another movable contact point of the first relay; the test bus is connected to a movable contact point of a second relay, the subscriber line is connected to another contact point of the second relay; a static contact point of the first relay is connected to a static contact point of the second relay.

Another analog subscriber board of the invention comprises a subscriber line interface circuit and subscriber line as well as two relays for each subscriber, and a common ring bus, a common test bus and a common relay in one subscriber group, wherein the subscriber line interface circuit is connected to a movable contact point of a first subscriber relay; the ring bus is connected to another movable contact point of the first relay and a movable contact point of the common relay simultaneously; the test bus is connected to a static contact point of the common relay; the subscriber line is connected to a static contact point of the first relay and a contact point of a second relay; another contact point of the second relay is connected to another movable contact point of the common relay.

A further analog subscriber board of the invention comprises a subscriber line interface circuit and a subscriber line as well as two relays for each subscriber a, and a common ring bus, a common test bus and two common relays in one subscriber group, wherein the subscriber line interface circuit is connected to a movable contact point of a first subscriber relay and a movable contact point of a second subscriber relay simultaneously; the ring bus is connected to a movable contact point of the first common relay and a movable contact point of a second common relay simultaneously; the test bus is connected to a static contact point of the first common relay; the subscriber line is connected to a static contact point of the second subscriber relay; another movable contact point of the first common relay is connected to another movable contact point of the second common relay; a static contact point of the second common relay is connected to a static contact point of the first subscriber relay; another movable contact point of the first subscriber relay is connected to another movable contact point of the second subscriber relay.

A further analog subscriber board of the invention comprises a subscriber line interface circuit and a subscriber line as well as two relays for each subscriber, and a common ring bus, a common test bus and two common relays in one subscriber group, wherein the subscriber line is connected to a movable contact point of a first subscriber relay and a movable contact point of a second subscriber relay simulta-neously; the ring bus is connected to a movable contact point of a first common relay and a movable contact point of a second common relay simultaneously; the test bus is connected to a static contact point of the first common relay; the subscriber line interface circuit is connected to a static contact point of the second subscriber relay; another movable contact point of the first common relay is connected to another movable contact point of the second common relay; a static contact point of the second common relay is connected to a static contact point of the first subscriber relay; another movable contact point of the first subscriber relay is connected to another movable contact point of the second subscriber relay.

A further analog subscriber board of the invention comprises a subscriber line interface circuit and a subscriber line as well as two relays for each subscriber, and a common ring bus, a common test bus and two common relays in one subscriber group, wherein the subscriber line interface circuit is connected to a movable contact point of a first subscriber relay; the ring bus is connected to a contact point of a first common relay; the test bus is connected to a movable contact point of a second common relay and a movable contact point of a second subscriber relay simultaneously; the subscriber line is connected to another movable contact point of a second subscriber relay; a static contact point of the first subscriber relay is connected to a static contact point of the second subscriber relay; another movable contact point of the first subscriber relay is connected to a static contact point of the second common relay; another movable contact point of the second common relay is connected to another contact point of the first common relay.

A new analog subscriber board can be provided through the invention, which has a relatively less number of relay with respect to each subscriber, reduces the cost and saves the space while realizing the basic functions in a voice network.

BRIEF DESCRIPTION OF ACCOMPANYING DRAWINGS

The technical solution of the invention will be described in embodiments with reference to the accompanying drawings, wherein FIG. 1 is a schematic diagram showing the connection of relays in an analog subscriber board of the prior art;

DETAILED DESCRIPTION OF THE PREFERRED EMBODIMENTS

The preferred embodiments of the invention will be described in detail with reference to the accompanying drawings as follows.

Figure 1:
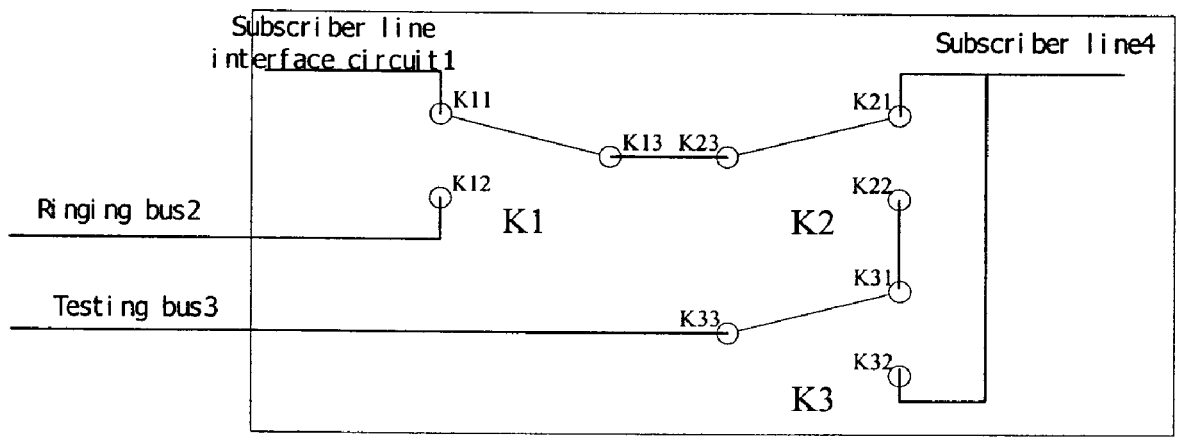
Figure 2:
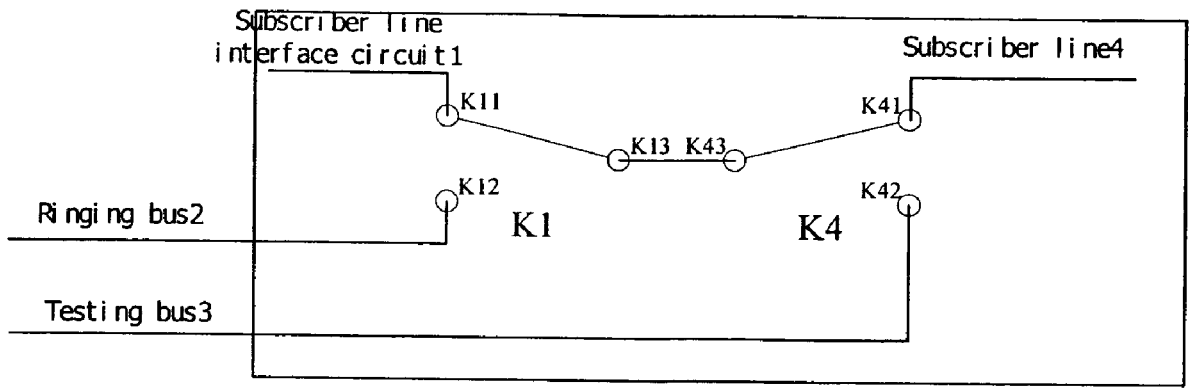
FIG. 2 is a schematic diagram showing the connection of relays in an analog subscriber board of one embodiment of the invention.

FIG. 2 is a schematic diagram showing the connection of relays in an analog subscriber board of one embodiment of the invention.

In the analog subscriber board as shown in FIG. 2, there are a subscriber line interface circuit 1 and a subscriber line 4 for each subscriber solely, and a common ring bus 2 and a common test bus 3 in one subscriber group. Moreover, each subscriber has two relays K1 and K2. Other parts irrelevant directly to the technology of the invention are not shown in the drawing.

In this analog subscriber board, subscriber line interface circuit 1 is connected to movable contact point K11 of relay K1, ring bus 2 is connected to another movable contact point K12 of relay K1. Test bus 3 is connected to movable contact point K42 of relay K4, subscriber line 4 is connected to another movable contact point K41 of relay K4. Static contact point K13 of relay K1 is connected to static contact point K43 of relay K4.

In FIG. 2, for simplification, only one subscriber is shown in the connection schematic diagram. In actual application, subscriber line interface circuit 1 and subscriber line 4 are for each subscriber solely, ring bus 2 and test bus 3 are common to all subscribers in one group. A plurality of analog voice functions can be provided by providing two relays K1, K4 for each subscriber respectively.

Table 2 shows the realization of the various functions of the analog subscriber board. Various functions can be realized by controlling the states of two relays K1, K4 respectively.

TABLE 2

Realization of Various Functions of Analog Subscriber Board of One Embodiment of the Invention

| State of K1 | State of K4 | Functions |
|---|---|---|
| K11 | K41 | talking/idle |
| K12 | K41 | ringing |
| K11 | K42 | testing subscriber line interface circuit |
| K12 | K42 | testing ring |

More specifically, when relay K4 turns on movable contact point K41 connected to subscriber line 4, the analog subscriber board realizes correspondingly talking/idle function or ringing function respectively according to that relay K1 turns on movable contact point K11 connected to subscriber line interface circuit 1 or turns on movable contact point K12 connected to ring bus 2; when relay K4 turns on movable contact point K42 connected to test bus 3, the analog subscriber board realizes correspondingly the function for testing the subscriber line interface circuit or the function for testing ring respectively according to that relay K1 turns on movable contact point K11 connected to subscriber line interface circuit 1 or turns on movable contact point K12 connected to ring bus 2.

Hence, the analog subscriber board can realize the functions of talking/idle, ringing, testing subscriber line interface circuit and testing ring by providing two relays for each subscriber.

However, the monitoring function is not provided in above solution of line and relay in an analog subscriber board. In order to satisfy the different requirements of the subscribers the invention provides other solutions of line and relay in an analog subscriber board.

Figure 3:
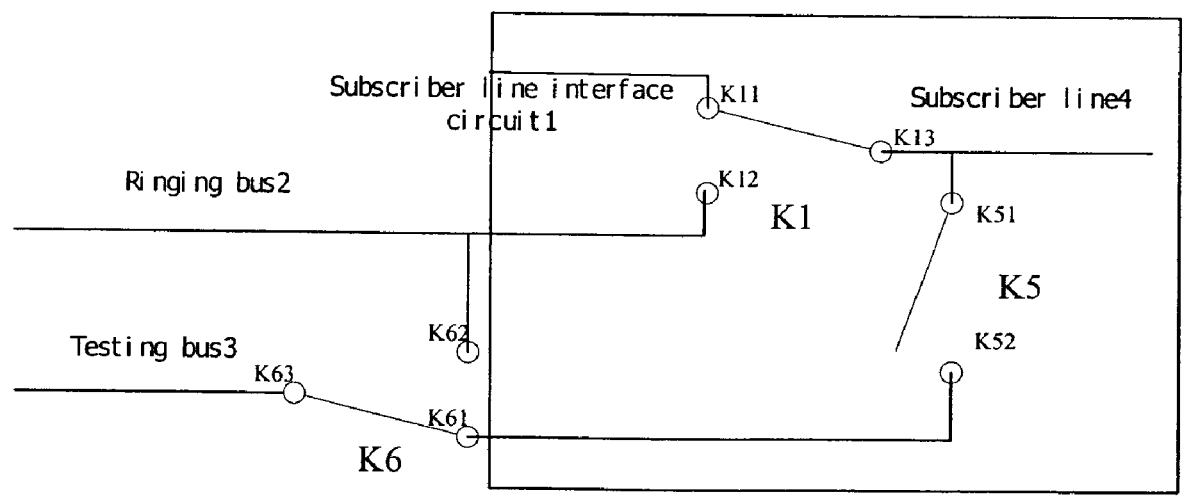
FIG. 3 is a schematic diagram showing the connection of relays and subscriber group relay in an analog subscriber board of another embodiment of the invention.

FIG. 3 is a schematic diagram showing the connection of relays and subscriber group relay in an analog subscriber board of another embodiment of the invention.

In the analog subscriber board as shown in FIG. 3, there are subscriber line interface circuit 1 and subscriber line 4 for each subscriber solely, and common ring bus 2 and common test bus 3 in one subscriber group. Each subscriber has two relays K1 and K5, moreover, each subscriber group has common relay K6. Other parts irrelevant directly to the technology of the invention are not shown in the drawing.

In this analog subscriber board, subscriber line interface circuit 1 is connected to movable contact point K11 of relay K1, ring bus 2 is connected to another movable contact point K12 of relay K1 and movable contact point K62 of relay K6 simultaneously. Test bus 3 is connected to static contact point K63 of relay K6. Subscriber line 4 is connected to static contact point K13 of relay K1 and a contact point K51 of relay K5 simultaneously. Another contact point K52 of relay K5 is connected to another movable contact point K61 of relay K6.

Table 3 shows the realization of the various functions of the analog subscriber board. Various functions can be realized by controlling the states of three relays K1, K5, K6 respectively.

TABLE 3

Realization of Various Functions of Analog Subscriber Board in FIG. 3

| State of K1 | State of K6 | State of K5 | Functions |
|---|---|---|---|
| K11 | K61 | off | talking/idle |
| K12 | K61 | off | ringing |
| K11 | K61 | on | monitoring talking |
| K12 | K61 | on | monitoring ringing |
| K11 | K62 | — | testing ring, talking/idle |
| K12 | K62 | — | monitoring ringing |

More specifically, when relay K6 is controlled to turn on movable contact point K61, the analog subscriber board realizes the basic functions (talking/idle or ringing) or the monitoring functions (monitoring talking or monitoring ringing), wherein when relay K5 is off, the analog subscriber board realizes correspondingly the talking/idle function or ringing function respectively according to that relay K1 turns on movable contact point K11 or movable contact point K12; when relay K5 is on, the analog subscriber board realizes correspondingly the talking monitoring function or the ringing monitoring function respectively according to that relay K1 turns on movable contact point K11 or movable contact point K12.

When relay K6 is controlled to turn on movable contact point K62, the analog subscriber board realizes the ring testing function or the ringing monitoring function, wherein when relay K1 turns on movable contact point K11, the analog subscriber board realizes the ring testing function; when relay K1 turns on movable contact point K12, the analog subscriber board realizes the ringing monitoring function. The talking/idle function can also be realized while ring testing function being realized.

Hence, the analog subscriber board can realize the functions of talking/idle, ringing, monitoring talking, monitoring ringing and testing ring by providing two relays for each subscriber and a common relay in a subscriber group.

Figure 4:
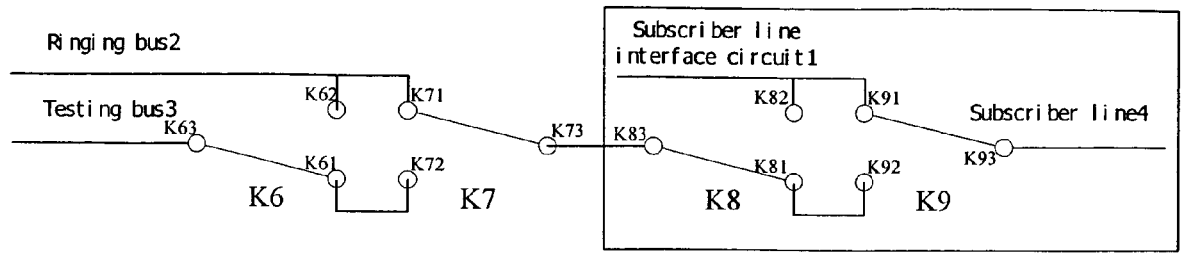
FIG. 4 is a schematic diagram showing the connection of relays and subscriber group relays in an analog subscriber board of a further embodiment of the invention.

FIG. 4 is a schematic diagram showing the connection of relays and subscriber group relays in an analog subscriber board of a further embodiment of the invention.

In the analog subscriber board as shown in FIG. 4, there are subscriber line interface circuit 1 and subscriber line 4 for each subscriber solely, and common ring bus 2 and common test bus 3 in one subscriber group. Each subscriber has two relays K8 and K9, moreover, each subscriber group has two common relays K6 and K7. Other parts irrelevant directly to the technology of the invention are not shown in the drawing.

In this analog subscriber board, subscriber line interface circuit 1 is connected to movable contact point K82 of relay K8 and movable contact point K91 of relay K9 simultaneously, ring bus 2 is connected to movable contact point K62 of relay K6 and movable contact point K71 of relay K7 simultaneously. Test bus 3 is connected to static contact point K63 of relay K6. Subscriber line 4 is connected to static contact point K93 of relay K9. Another movable contact point K61 of relay K6 is connected to another movable contact point K72 of relay K7. Static contact point K73 of relay K7 is connected to static contact point K83 of relay K8. Another movable contact point K81 of relay K8 is connected to another movable contact point K92 of relay K9.

Table 4 shows the realization of the various functions of the analog subscriber board. Various functions can be realized by controlling the states of two common relays K6, K7 and two subscriber relays K8, K9 respectively.

TABLE 4

Realization of Various Functions of Analog Subscriber Board in FIG. 4

| State of K9 | State of K8 | State of K6 | State of K7 | Functions |
|---|---|---|---|---|
| K91 | K81 | K61 | — | talking/idle |
| K91 | K81 | K62 | — | talking/idle, testing ring |
| K92 | K81 | K61 | K71 | ringing |
| K92 | K81 | K61 | K72 | testing subscriber line |
| K92 | K81 | K62 | K71 | monitoring ringing |
| K92 | K81 | K62 | K72 | testing ring, talking/idle |
| K91 | K82 | K61 | K72 | monitoring talking |
| K92 | K82 | K61 | K72 | testing subscriber line interface circuit |
| K92 | K82 | K62 | K72 | testing ring |

Other states not shown in table 4 are unallowable states.

Figure 5:
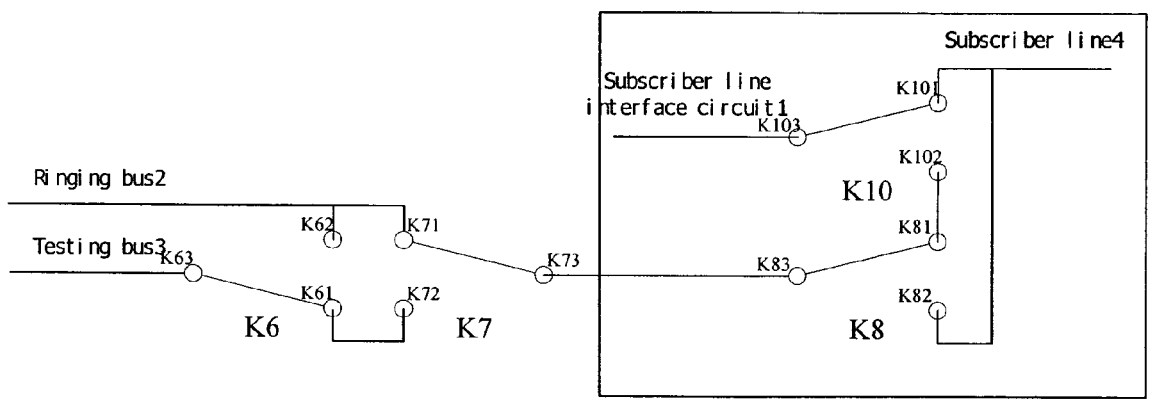
FIG. 5 is a schematic diagram showing the connection of relays and subscriber group relays in an analog subscriber board of a variation of a further embodiment of the invention.

FIG. 5 is a variation of the analog subscriber board in FIG. 4.

In the analog subscriber board, there are subscriber line interface circuit 1 and subscriber line 4 for each subscriber solely, and common ring bus 2 and common test bus 3 in one subscriber group. Each subscriber has two relays K8 and K10, moreover, each subscriber group has two common relays K6 and K7. Other parts irrelevant directly to the technology of the invention are not shown in the drawing.

In this analog subscriber board, subscriber line 4 is connected to movable contact point K82 of relay K8 and movable contact point K101 of relay K10 simultaneously. Ring bus 2 is connected to movable contact point K62 of relay K6 and movable contact point K71 of relay K7 simultaneously. Test bus 3 is connected to static contact point K63 of relay K6. Subscriber line interface circuit 1 is connected to static contact point K103 of relay K10. Another movable contact point K61 of relay K6 is connected to another movable contact point K72 of relay K7. Static contact point K73 of relay K7 is connected to static contact point K83 of relay K8. Another movable contact point K81 of relay K8 is connected to another movable contact point K102 of relay K10.

Table 5 shows the realization of the various functions of the analog subscriber board. Various functions can be realized by controlling the states of two common relays K6, K7 and two subscriber relays K8, K10 respectively.

TABLE 5

Realization of Various Functions of Analog Subscriber Board in FIG. 5

| State of K10 | State of K8 | State of K6 | State of K7 | Functions |
|---|---|---|---|---|
| K101 | K81 | K61 | — | talking/idle |
| K101 | K81 | K62 | — | talking/idle, testing ring |
| K102 | K82 | K61 | K71 | ringing |
| K102 | K82 | K61 | K72 | testing subscriber line |
| K102 | K82 | K62 | K71 | monitoring ringing |
| K102 | K82 | K62 | K72 | testing ring, talking/idle |
| K101 | K82 | K61 | K72 | monitoring talking |
| K102 | K81 | K61 | K72 | testing subscriber line interface circuit |
| K102 | K81 | K62 | K72 | testing ring |

Other states not shown in table 5 are unallowable states.

Hence, the analog subscriber board can realize all of the functions of talking/idle, ringing, monitoring talking, monitoring ringing, testing subscriber line, testing subscriber line interface circuit and testing ring by providing two relays for each subscriber and two common relays in a subscriber group.

Figure 6:
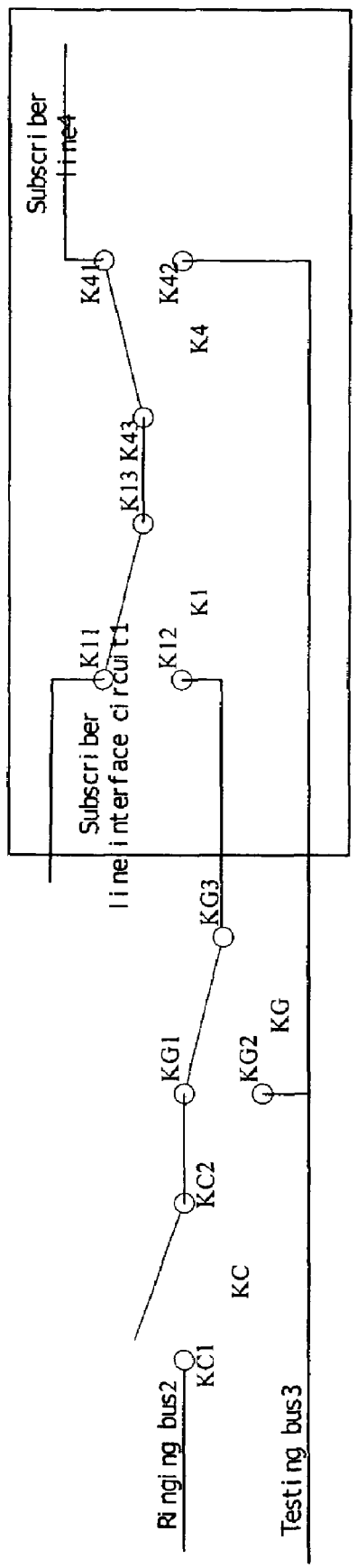
FIG. 6 is a schematic diagram showing the connection of relays and subscriber group relays in an analog subscriber board of a still further embodiment of the invention.

FIG. 6 is a schematic diagram showing the connection of relays and subscriber group relays in an analog subscriber board of a still further embodiment of the invention.

In the analog subscriber board as shown in FIG. 6, there are subscriber line interface circuit 1 and subscriber line 4 for each subscriber solely, and common ring bus 2 and common test bus 3 in one subscriber group. Each subscriber has two relays K1 and K4, moreover, each subscriber group has two common relays KC and KG. Other parts irrelevant directly to the technology of the invention are not shown in the drawing.

In this analog subscriber board, subscriber line interface circuit 1 is connected to movable contact point K11 of relay K1, ring bus 2 is connected to contact point KC1 of relay KC. Test bus 3 is connected to movable contact point KG2 of relay KG and movable contact point K42 of relay K4 simultaneously, subscriber line 4 is connected to another movable contact point K41 of relay K4. Static contact point K13 of relay K1 is connected to static contact point K43 of relay K4. Another movable contact point K12 of relay K1 is connected to static contact point KG3 of relay KG. Another movable contact point KG1 of relay KG is connected to another contact point KC2 of relay KC.

Figure 7:
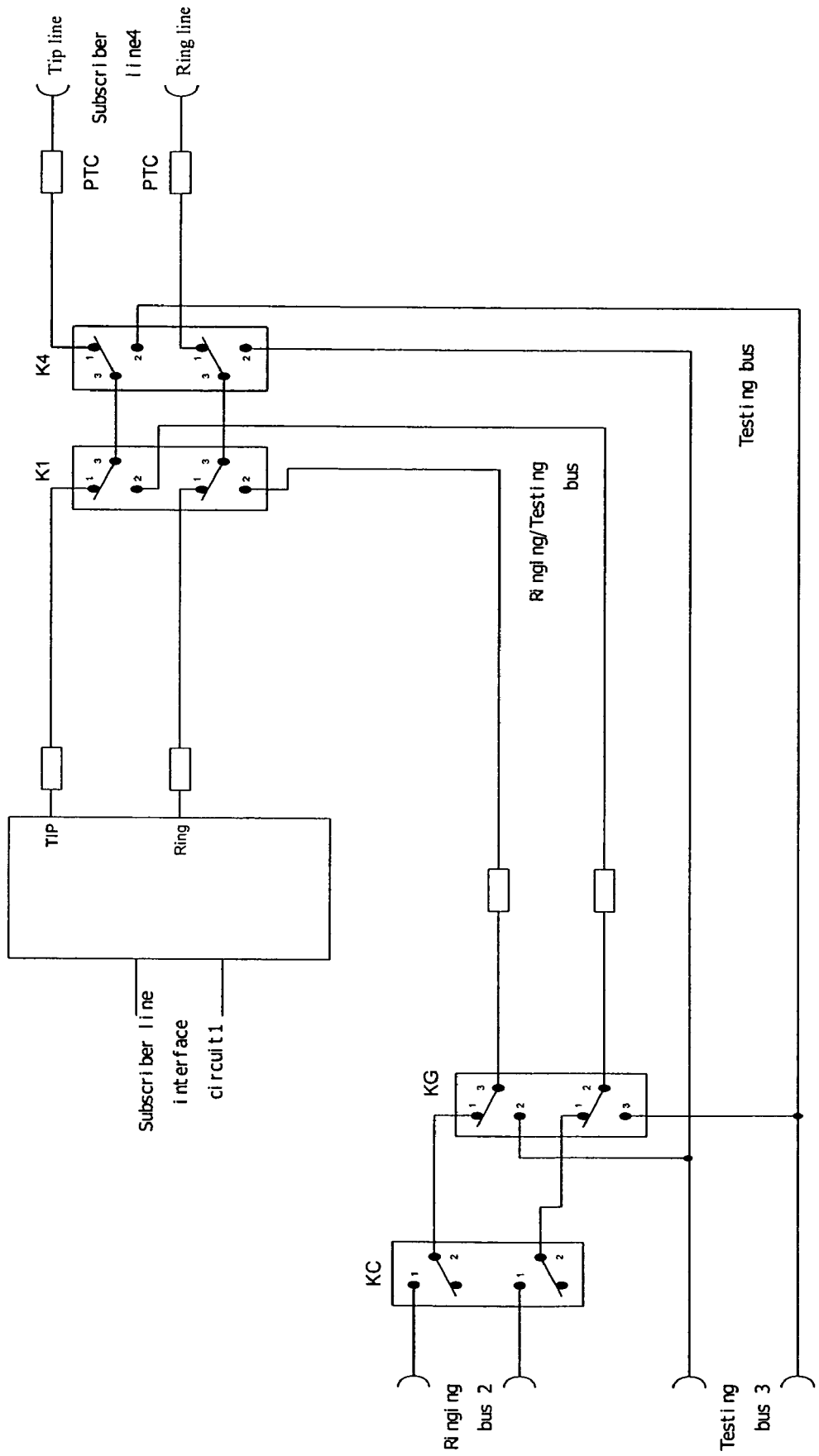
FIG. 7 is a diagram with double-lines showing the actual connecting principle of the relays and the subscriber group relays in an analog subscriber board in FIG. 6.

FIG. 7 is a diagram showing the actual connecting principle of the embodiment in FIG. 6. Table 6 shows the realization of the various functions of the analog subscriber board. Various functions can be realized by controlling the states of two common relays KC, KG and two subscriber relays K1, K4 respectively.

TABLE 6

Realization of Various Functions of Analog Subscriber Board in FIG. 6

| State of K1 | State of K4 | State of KC | State of KG | Function |
|---|---|---|---|---|
| K11 | K41 | — | — | talking/idle |
| K12 | K41 | on | KG1 | ringing |
| K12 | — | off | KG1 | separating connection |
| K12 | K41 | — | KG2 | testing subscriber line |

TABLE 6-continued

Realization of Various Functions of Analog Subscriber Board in FIG. 6

| State of K1 | State of K4 | State of KC | State of KG | Function |
|---|---|---|---|---|
| K12 | K42 | — | KG2 | separating connection |
| K12 | K42 | on | KG1 | testing ring |
| K11 | K42 | — | — | testing subscriber line interface circuit |

Hence, the analog subscriber board can realize the functions of talking/idle, ringing, testing subscriber line, testing subscriber line interface circuit and testing ring by providing two relays for each subscriber and two common relays in a subscriber group. Although the analog monitoring function is lost, it can be supplemented with digital monitoring, so that all functions can be realized.

In addition, since a state of separating connection is provided, the idle subscriber line can be separated from the whole voice system, so that the influence on other lines resulting from interferences and abnormal signals can be avoided, and the errors can be reduced.

Moreover, when the ringing function is not needed by any subscriber in a group and testing ring is not performed, ring bus 2 can be separated from the subscriber group by controlling KC to be off, so that the power consumption of the ring bus can be decreased.

In above embodiments in FIG. 2~FIG. 6, for simplification, ring bus 2, test bus 3, subscriber line interface circuit 1 and subscriber line 4 are indicated with single-lines. In an actual voice network, all lines must be constituted of double-lines, as shown in FIG. 7. Correspondingly, every relay must be changed from single-line relay to double-line relay.

However, schematic diagram with single-lines can clearly indicate the connection relation of the lines in the invention, and those technical personnel in this field can obtain directly the connection diagram with double-line with respect to FIG. 2~FIG. 5 according to the corresponding relation between FIG. 6 and FIG. 7, so that the schematic diagram with single-line is used directly to indicate the connection relation of the lines in the invention.

For example, FIG. 7 is a diagram with double-lines showing the actual connecting principle of the relays and the subscriber group relays in an analog subscriber board in FIG. 6. It can be seen in FIG. 7 that every line in FIG. 6 is replaced with double-line and the relays with single-line are changed correspondingly to the relays with double-line, wherein it is well known in this field that the subscriber line interface circuit and the subscriber line are constituted of the pair of TIP/RING with double-line, and their TIPs/RINGs correspond with each other when the pair of TIP/RING with double-line are connected.

To sum up from above, in order to reduce the number of the whole relays provided, the technical solution of the invention provides each subscriber with two relays to connect the subscriber line interface circuit, the subscriber line, the ring bus and the test bus, realizing the basic functions relevant to the talking, such as talking, ringing, etc. In order to add the auxiliary functions such as the testing function and the monitoring function, at least one relay can be supplemented in a subscriber group, the subscriber group relays together with above two subscriber relays will be used to connect the subscriber line interface circuit, the subscriber line, the ring bus and the test bus to perform the basic functions relevant to talking and the auxiliary functions such as testing, monitoring, etc. Compared with the prior art, the number of whole relays in the analog subscriber board of the invention is reduced, so that the whole cost of the subscriber board is decreased.

In contrast with the invention, the relays relevant to the auxiliary functions of the analog subscriber board of the prior art are provided in the subscriber, so that the number of whole relays provided must be increased.

Two subscriber relays and the subscriber group relays of the invention can be connected to the subscriber line interface circuit, the subscriber line, the ring bus and the test bus in various ways, as shown in FIGS. 2~6, and above-mentioned embodiments are not intended to exhaust all aspects of the invention. Therefore, these specific connection ways should not be considered as the limitation to the invention, and the present invention will be defined by the appendant claims.

What is claimed is:

1. An analog subscriber board used in a voice network, comprising:
    a subscriber line interface circuit;
    a subscriber line for each subscriber;
    a common ring bus; and
    a test bus in a subscriber group;
    wherein the subscriber line interface circuit, the subscriber line, the ring bus and the test bus are connected at least through a first relay and a second relay, the test bus being connected to a movable contact point of the second relay and the subscriber line being connected to another movable contact point of the second relay.

2. The analog subscriber board according to claim 1, wherein:
    the subscriber line interface circuit is connected to a movable contact point of a first relay, the ring bus is connected to another movable contact point of the first relay; and a static contact point of the first relay is connected to a static contact point of the second relay.

3. The analog subscriber board according to claim 1, wherein said subscriber line interface circuit, subscriber line, ring bus and test bus are connected further through a first common relay in the subscriber group.

4. The analog subscriber board according to claim 3, wherein:
    the subscriber line interface circuit is connected to a movable contact point of the first subscriber relay;
    the ring bus is connected to another movable contact point of the first relay and a movable contact point of the first common relay simultaneously;
    the test bus is connected to a static contact point of the first common relay;
    the subscriber line is connected to a static contact point of the first relay and a contact point of the second relay; and
    another contact point of the second relay is connected to another movable contact point of the first common relay.

5. The analog subscriber board according to claim 3, wherein:
    said subscriber line interface circuit, subscriber line, ring bus and test bus are connected further through a second common relay in the subscriber group.

6. The analog subscriber board according to claim 5, wherein:
    the subscriber line interface circuit is connected to a movable contact point of the first relay and a movable contact point of the second relay simultaneously;
    the ring bus is connected to a movable contact point of the first common relay and a movable contact point of the second common relay simultaneously;

the test bus is connected to a static contact point of the first common relay;

the subscriber line is connected to a static contact point of the second relay; another movable contact point of the first common relay is connected to another movable contact point of the second common relay; a static contact point of the second common relay is connected to a static contact point of the first relay; and another movable contact point of the first relay is connected to another movable contact point of the second relay.

7. The analog subscriber board according to claim 5, wherein:

the subscriber line is connected to a movable contact point of the first relay and a movable contact point of the second relay simultaneously;

the ring bus is connected to a movable contact point of the first common relay and a movable contact point of the second common relay simultaneously;

the test bus is connected to a static contact point of the first common relay;

the subscriber line interface circuit is connected to a static contact point of the second relay;

another movable contact point of the first common relay is connected to another movable contact point of the second common relay; a static contact point of the second common relay is connected to a static contact point of the first relay; and another movable contact point of the first relay is connected to another movable contact point of the second relay.

8. The analog subscriber board according to claim 5, wherein:

the subscriber line interface circuit is connected to a movable contact point of the first relay;

the ring bus is connected to a contact point of the first common relay;

the test bus is connected to a movable contact point of the second common relay and a movable contact point of the second relay simultaneously;

the subscriber line is connected to another movable contact point of the second relay; and a static contact point of the first relay is connected to a static contact point of the second relay; another movable contact point of the first relay is connected to a static contact point of the second common relay; and another movable contact point of the second common relay is connected to another contact point of the first common relay.

\* \* \* \* \*